US010570795B2

(12) United States Patent
Kawaguchi et al.

(10) Patent No.: US 10,570,795 B2
(45) Date of Patent: Feb. 25, 2020

(54) COMBUSTION ENGINE EXHAUST GAS PURIFYING FACILITY

(71) Applicant: HITACHI ZOSEN CORPORATION, Osaka (JP)

(72) Inventors: Hiroaki Kawaguchi, Osaka (JP); Hiroshi Tanaka, Osaka (JP); Shinji Baba, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 15/780,592

(22) PCT Filed: Dec. 5, 2016

(86) PCT No.: PCT/JP2016/086082
§ 371 (c)(1),
(2) Date: May 31, 2018

(87) PCT Pub. No.: WO2017/094915
PCT Pub. Date: Jun. 8, 2017

(65) Prior Publication Data
US 2018/0371975 A1    Dec. 27, 2018

(30) Foreign Application Priority Data

Dec. 3, 2015    (JP) ................. 2015-236326

(51) Int. Cl.
*F01N 13/00*    (2010.01)
*F01N 3/20*    (2006.01)
(Continued)

(52) U.S. Cl.
CPC ............. *F01N 3/206* (2013.01); *B01D 53/90* (2013.01); *B01D 53/94* (2013.01);
(Continued)

(58) Field of Classification Search
CPC ...... F01N 3/2066; F01N 3/208; F01N 13/004; F01N 2590/02; F01N 2610/02;
(Continued)

(56) References Cited

U.S. PATENT DOCUMENTS 6,093,380 A * 7/2000 Lagana ................ B01D 53/346
423/235

FOREIGN PATENT DOCUMENTS

CN    102159455 A    8/2011
EP    2332826 A1    6/2011
(Continued)

OTHER PUBLICATIONS

Machine translation of JP2005324134A, accessed on Jun. 20, 2019. (Year: 2019).*

(Continued)

*Primary Examiner* — Jonathan R Matthias
(74) *Attorney, Agent, or Firm* — Pillsbury Winthrop Shaw Pittman, LLP

(57) ABSTRACT

An exhaust gas purifying facility of a combustion engine includes: a marine combustion engine; a reducing device for feeding urea water into an exhaust gas in an exhaust gas line of the marine combustion engine; and a generation device for generating the urea water from urea powder. The generation device includes a storage-generation tank device and an adjustment tank device capable of adjusting the density of the urea water. The storage-generation tank device has a storage-generation tank for storing the urea powder and feeding water to the urea powder for dissolution. The adjustment tank device has an adjustment tank for storing the urea water withdrawn from the storage-generation tank.

6 Claims, 6 Drawing Sheets

(51) Int. Cl.
  *B01D 53/94* (2006.01)
  *B01D 53/90* (2006.01)
(52) U.S. Cl.
  CPC ......... *B01D 53/9431* (2013.01); *F01N 3/208*
    (2013.01); *B01D 2251/2067* (2013.01); *B01D
    2257/404* (2013.01); *B01D 2258/012*
    (2013.01); *B01D 2259/4566* (2013.01); *F01N
    3/2066* (2013.01); *F01N 13/004* (2013.01);
    *F01N 2560/12* (2013.01); *F01N 2590/02*
    (2013.01); *F01N 2610/02* (2013.01); *F01N
    2610/10* (2013.01); *F01N 2610/12* (2013.01);
    *F01N 2610/142* (2013.01); *F01N 2610/1406*
    (2013.01); *F01N 2610/1433* (2013.01); *F01N
    2900/1818* (2013.01)
(58) Field of Classification Search
  CPC ......... F01N 2610/12; F01N 2610/1406; F01N
    2610/142; F01N 2610/1473; F01N
    2900/1818
  See application file for complete search history.

(56) References Cited

FOREIGN PATENT DOCUMENTS

| | | | |
|---|---|---|---|
| JP | 08-001436 U | 10/1996 | |
| JP | 2002-510005 A | 4/2002 | |
| JP | 2005-324134 A | 11/2005 | |
| JP | 2010-071148 A | 4/2010 | |
| JP | 2016/086082 Y2 | 12/2016 | |
| WO | WO-2010084080 A1 * | 7/2010 | ............ B01F 1/0011 |

OTHER PUBLICATIONS

Machine translation of JP2010071148A, accessed on Jun. 20, 2019. (Year: 2019).*
Machine translation of WO2010084080A1, accessed on Jun. 20, 2019. (Year: 2019).*
International Search Report PCT/JP2016/086082 dated Dec. 27, 2016 with English translation.
First Office Action Chinese Patent Application No. 201680070029.4 dated Oct. 25, 2019 with English translation.

* cited by examiner

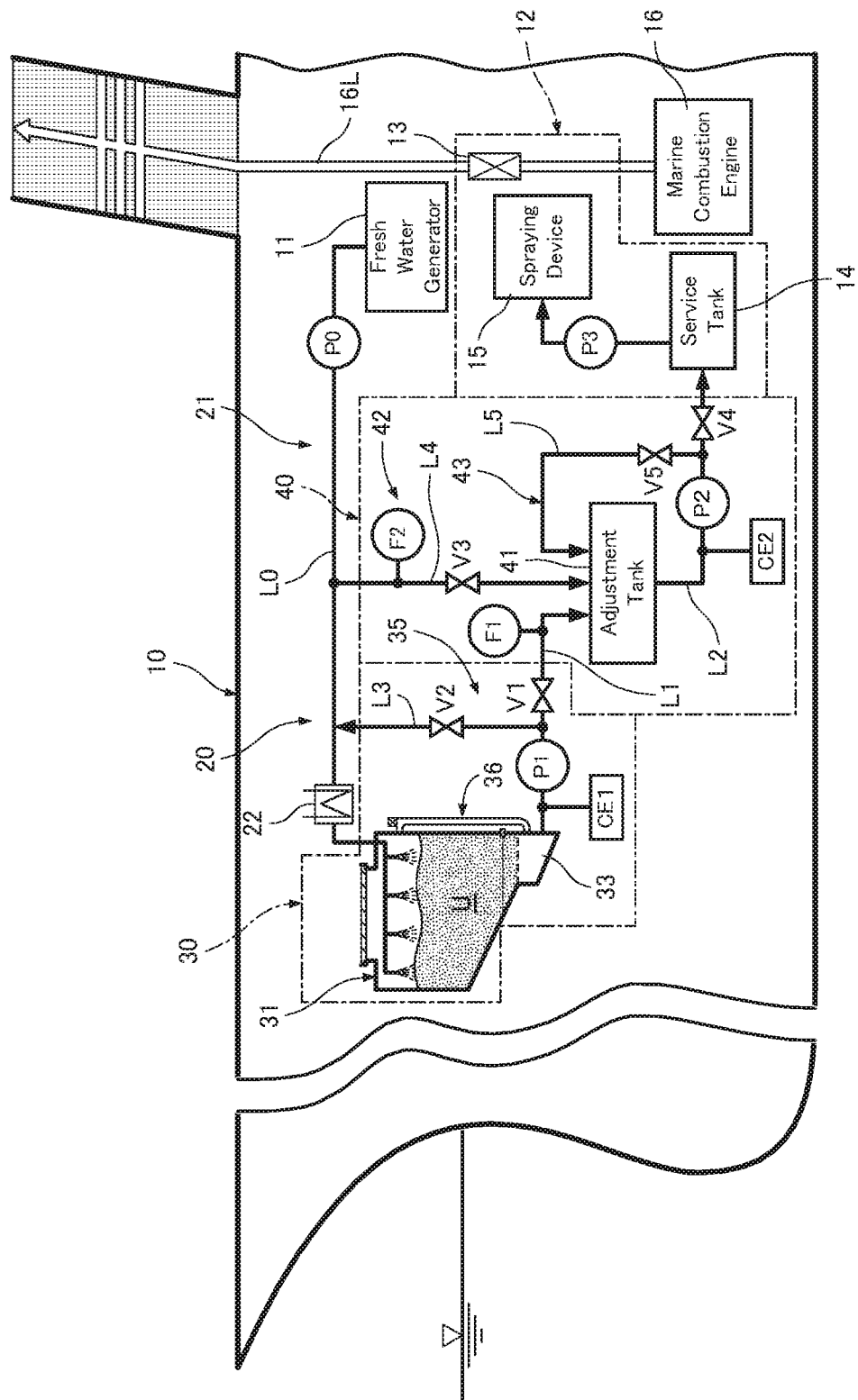
F I G. 1

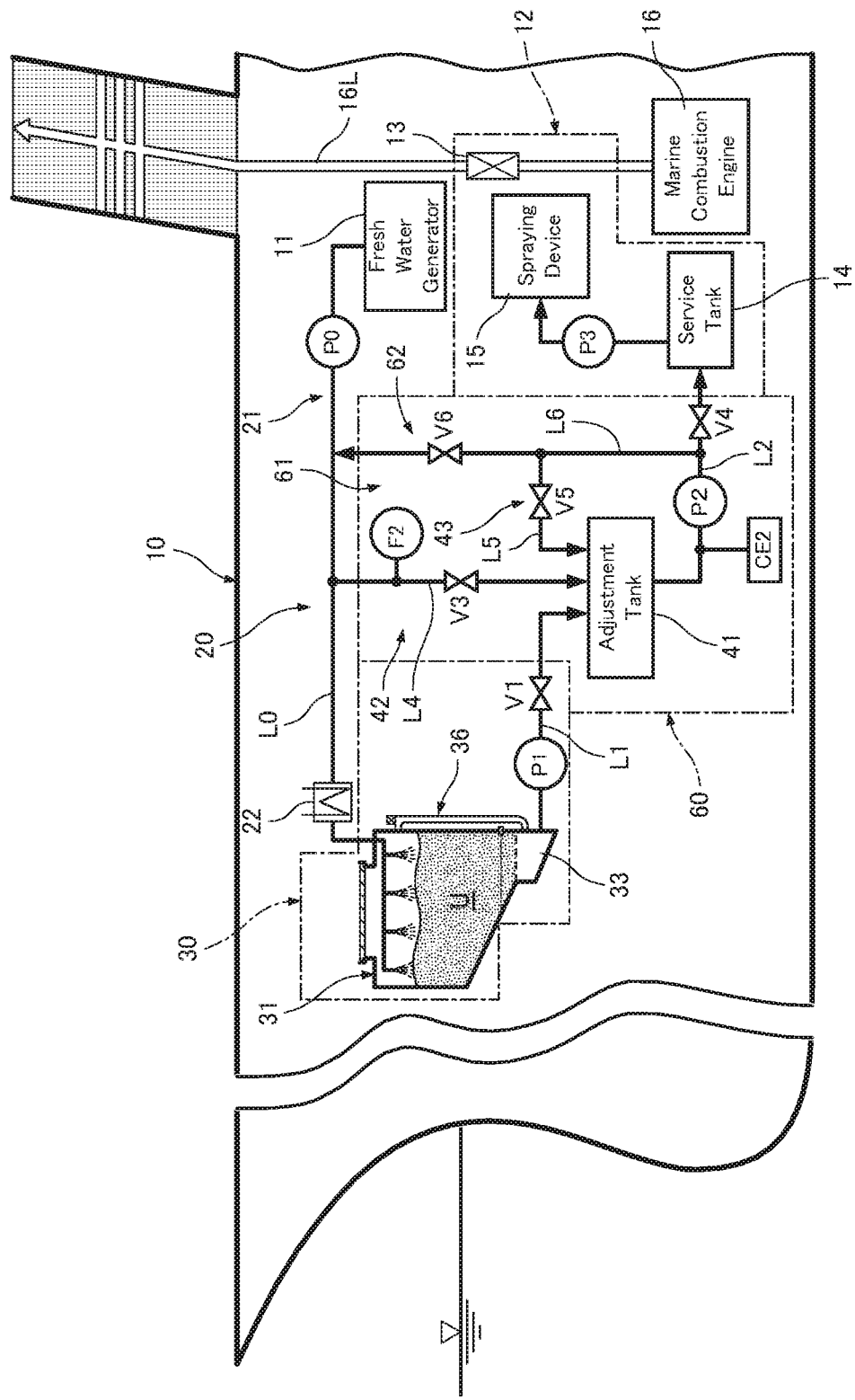
F I G. 5

COMBUSTION ENGINE EXHAUST GAS PURIFYING FACILITY

CROSS REFERENCE TO RELATED APPLICATIONS

This is the U.S. National Stage of PCT/JP2016/086082, filed Dec. 5, 2016, which in turn claims priority to Japanese Patent Application No. 2015-236326, filed Dec. 3, 2015, the contents of each of these applications being incorporated herein by reference in their entities.

TECHNICAL FIELD

The present invention relates to an exhaust gas purifying facility of a combustion engine.

BACKGROUND

Conventional facilities for reducing NOx in exhaust gas from combustion engines employ methods such as the selective catalytic reduction (SCR) method and the selective non-catalytic reduction (SNCR) method. In the SCR method, a reducing agent is sprayed into the exhaust gas, and the exhaust gas is denitrated with a catalyst. The SNCR method accomplishes denitration without using a catalyst.

Among transport machines employing the SCR method for example, cars traveling on land by a diesel engine can be replenished with a reducing agent such as ammonia water ($NH_3$) and urea water at a large number of sites. Therefore, such cars can be replenished with a reducing agent immediately when running out of the reducing agent while traveling. By contrast, ships among the above transport machines generate a larger amount of exhaust gas and thus require a larger amount of reducing agent than the cars, and moreover, ships can only be replenished with the reducing agent when visiting a port. Therefore, reducing agents having a smaller volume, such as urea powder, are studied for use in SCR for the ships.

For example, Patent Literature 1 discloses an exhaust gas purifying system that uses urea powder loaded on a ship. This system uses a fresh water generator, serving as one of the ship facilities, to generate urea water from the urea powder at any time. A ship that cannot be replenished with urea water at sea can be equipped with this exhaust gas purifying system to purify an exhaust gas (reduce the amount of NOx in the exhaust gas) while reducing the required space and the burden of the ship.

RELEVANT REFERENCES

Patent Literatures

Patent Literature 1: Japanese Patent Application Publication No. 2010-071148
Patent Literature 2: Japanese Utility Model Application Publication No. Hei 07-011147
Patent Literature 3: Japanese Utility Model Application Publication No. Hei 08-001436

SUMMARY

Urea powder is extremely soluble in water and thus tends to absorb water vapor in the atmosphere to solidify and adhere to a urea powder storage tank. Therefore, urea powder needs to be preserved appropriately. However, the environment in a ship is too humid for urea water to be loaded therein. To overcome this problem, Patent Literature 1 discloses that a drying device is provided to the urea powder storage tank (a material hopper).

Patent Literatures 2 and 3 each disclose a urea water solution generating device including: a solution tank for storing a saturated urea water; a mixing unit for mixing water and the urea water from the solution tank; and a setting unit for appropriately setting the amounts of water and the urea water from the solution tank both fed into the mixing unit so as to adjust the urea water in the mixing unit to a desired density. These urea water solution generating devices also additionally require a urea powder storage tank (a urea receiving tank) and a storeroom (a space) for preserving urea powder, resulting in a need of a large space for urea powder. Further, the humidity in the urea powder storage tank and the storeroom need to be managed appropriately so as to prevent adhesion of the urea powder to the urea powder storage tank and the storeroom.

In addition, the urea water solution generating devices of Patent Literatures 2 and 3 require a solution tank (a dissolution bath) and a stirring device (a mixer) for dissolving the urea powder in water to generate urea water. The solution tank receives the urea powder and water that are then stirred thoroughly in the solution tank, and therefore, the solution tank necessarily has a large volume.

The present invention addresses such circumstances, and a primary object thereof is to provide an exhaust gas purifying facility of a combustion engine that requires a smaller space.

An exhaust gas purifying facility of a combustion engine according to the present invention comprises: a combustion engine; a reducing device for feeding a reducing agent solution into an exhaust gas in an exhaust gas line of the combustion engine; and a generation device for generating the reducing agent solution from reducing agent powder, wherein the generation device includes: a storage-generation tank device having a storage-generation tank for storing the reducing agent powder and feeding a solvent to the reducing agent powder for dissolution; and an adjustment tank device having an adjustment tank for storing the reducing agent solution withdrawn from the storage-generation tank, the adjustment tank device being capable of adjusting a density of the reducing agent solution.

According to the above arrangement, the storage-generation tank stores the reducing agent powder and feeds the solvent to the stored reducing agent powder for dissolution to generate the reducing agent solution. Therefore, it is possible to eliminate the space for storing the reducing agent powder and reduce the space required for the exhaust gas purifying facility.

In the above arrangement, the storage-generation tank device includes a densifying device for densifying the reducing agent solution generated in the storage-generation tank, and the densifying device includes: a generation density meter for measuring the density of the reducing agent solution; and a densifying line for returning the generated reducing agent solution to the storage-generation tank to dissolve the reducing agent powder again.

According to the above arrangement, when the density of the reducing agent solution is low, the densifying device returns the reducing agent solution generated in the storage-generation tank to the storage-generation tank through the densifying line to dissolve the reducing agent powder again. This makes it possible to generate the reducing agent solution having a high density even when the amount of the reducing agent powder in the storage-generation tank is reduced and the contact surface area of the solvent is smaller.

In the above arrangement, the adjustment tank device includes a dilution device for adjusting the density of the reducing agent solution, and the dilution device includes a solvent supplementing line for supplementing the solvent to the adjustment tank.

According to the above arrangement, the adjustment tank device supplements the solvent to the adjustment tank based on the sensing value of the generation density meter, thereby to dilute the reducing agent solution having a high density into a density range suited for exhaust gas reduction.

Further, in the above arrangement, the adjustment tank device includes a density adjustment device for adjusting the density of the reducing agent solution into an appropriate range, and the density adjustment device includes: an adjustment density meter for measuring the density of the reducing agent solution of the adjustment tank; a return flow line for returning the reducing agent solution of the adjustment tank to the storage-generation tank to dissolve the reducing agent powder again; and a dilution line for supplementing the solvent to the adjustment tank.

According to the above arrangement, when the density of the reducing agent solution in the adjustment tank sensed by the adjustment density meter is lower than the appropriate range, the adjustment tank device returns the reducing agent solution of the adjustment tank to the storage-generation tank to dissolve the reducing agent powder again, thereby densifying the reducing agent solution. On the other hand, when the sensed density of the reducing agent solution in the adjustment tank is higher than the appropriate range, the solvent is supplemented through the dilution line to the adjustment tank to return the reducing agent solution of the adjustment tank to the storage-generation tank to dissolve the reducing agent powder again, and reduce the density of the reducing agent solution. This makes it possible to adjust the density of the reducing agent solution in the adjustment tank into the appropriate range.

Further, in the above arrangement, the adjustment tank device includes a solution stirring device for stirring the reducing agent solution, and the solution stirring device includes a stirring line for withdrawing the reducing agent solution from the adjustment tank and returning the reducing agent solution to the adjustment tank, so as to circulate the reducing agent solution and stir the reducing agent solution in the adjustment tank.

According to the above arrangement, a return flow pump circulates the reducing agent solution through a circulation line to stir the reducing agent solution in the adjustment tank. This makes it possible to uniform the density of the reducing agent solution. In addition, the above arrangement withstands vibration and undergoes fewer malfunctions and can be maintained better as compared to mechanical stirring devices including rotary stirring blades.

In the above arrangement, the combustion engine is a marine combustion engine, the exhaust gas purifying facility includes: a solvent generator for generating the solvent by extracting fresh water from sea water; and a solvent feeding line for feeding the solvent to the storage-generation tank, and the solvent feeding line is provided with a heating device for heating the solvent to an appropriate temperature.

According to the above arrangement, the present invention can be applied to a marine combustion engine to use limited spaces in a ship efficiently. In addition, the heating device heats the solvent into the appropriate temperature range, making it possible to generate the reducing agent solution efficiently without a decrease in the dissolution state of the reducing agent powder.

Further, in the above arrangement, the storage-generation tank device includes: a solution storage portion for storing the reducing agent solution separated from the reducing agent powder by a solid-liquid separation member; and a solvent detector for detecting a liquid phase surface of the reducing agent solution in the adjustment tank.

According to the above arrangement, the solvent can be sufficiently soaked into the reducing agent powder based on the sensing value of the solvent level gauge, and the reducing agent solution having a high density can be smoothly withdrawn from the solution storage portion via the solid-liquid separation member.

ADVANTAGES

The present invention reduces the space required for storing the reducing agent powder and reduces the cost by eliminating a feeding device for feeding the reducing agent powder from the storage tank to the generation tank.

BRIEF DESCRIPTION OF THE DRAWINGS

FIG. 1 is a schematic view showing Embodiment 1 of an exhaust gas purifying facility of a marine combustion engine according to the present invention.

FIG. 5 is a schematic view showing Embodiment 2 of the exhaust gas purifying facility of a marine combustion engine according to the present invention.

DESCRIPTION OF EXAMPLE EMBODIMENTS

Embodiment 1

Outline of the Facility

Figure 2:
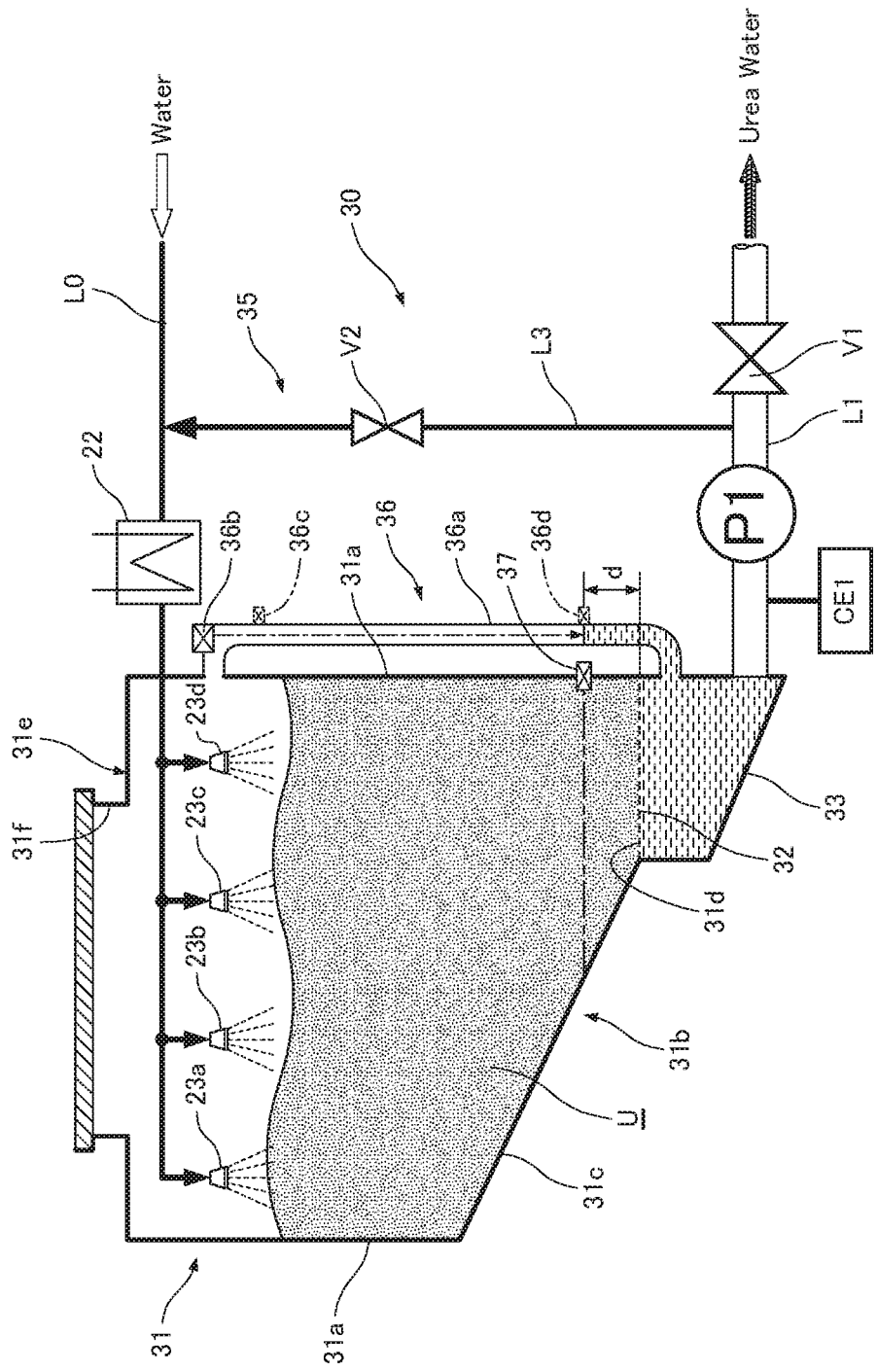
FIG. 2 is a vertical sectional view showing a storage-generation tank device.

FIG. 1 schematically shows an exhaust gas purifying facility of a marine combustion engine according to Embodiment 1 of the present invention. This exhaust gas purifying facility of the marine combustion engine is designed to be used on a ship 10 equipped with a fresh water generator (a solvent generator) 11 for refining water used as a solvent and a marine combustion engine 16 constituted by a large-sized diesel engine. The exhaust gas purifying facility purifies an exhaust gas emitted from the marine combustion engine 16 by a reducing device 12. The reducing device 12 includes a reducing catalyst 13 and a nozzled reducing agent spraying device 15. The reducing catalyst 13 is arranged in an exhaust gas line 16L, and the nozzled reducing agent spraying device 15 withdraws urea water (a reducing agent solution) from a service tank 14 by a reducing device pump P3 (FIG. 3) and sprays the urea water into the exhaust gas. The exhaust gas which contains the urea water sprayed by the reducing agent spraying device 15 is delivered onto the reducing catalyst 13 to remove air pollutants including nitrogen oxides (NOx), thereby to purify the exhaust gas.

The exhaust gas purifying facility includes a generation device 20 for generating urea water from urea powder U used as reducing agent powder. The generation device 20 includes a storage-generation tank device 30 and an adjustment tank device 40. The storage-generation tank device 30 includes a storage-generation tank 31, and the adjustment tank device 40 includes an adjustment tank 41 that stores the urea water generated in the storage-generation tank 31 such that the density of the urea water can be adjusted. The storage-generation tank 31 is capable of storing all the urea powder U necessary for at least one voyage and generating urea water by feeding water as a solvent to the urea powder U. The urea water in the adjustment tank 41 is fed to the service tank 14 of the reducing device 12. The adjustment tank device 40 includes an adjustment tank 41, a dilution device 42, and a stirring device 43.

The exhaust gas purifying facility also includes a solvent feeding line L0, a generation line L1, and a solution feeding line L2. The solvent feeding line L0 feeds water from the fresh water generator 11 to the storage-generation tank 31, the generation line L1 feeds the urea water from the storage-generation tank 31 to the adjustment tank 41, and the solution feeding line L2 feeds the urea water from the adjustment tank 41 to the service tank 14.

A solvent feeding device 21 for feeding water from the fresh water generator 11 to the storage-generation tank 31 includes a solvent feeding pump P0 in the upstream side of the solvent feeding line L0. The solvent feeding line L0 is provided with a heating device 22 in the vicinity of an inlet to the storage-generation tank 31. The heating device 22 heats the water in the solvent feeding line L0 using the hot water, steam, or electric power obtained from the marine combustion engine 16 and other components. The heating device 22 prevents that the dissolution of the urea powder U in water is inhibited in the storage-generation tank 31 due to a low water temperature caused by an endothermic reaction occurring when the urea powder U is dissolved in water. The suitable temperature of water as a solvent ranges from 40 to 50° C. This is because a water temperature lower than 40° C. reduces the amount of urea powder U dissolved in water and thus urea water having a high density is not generated, while a water temperature higher than 50° C. causes an ammonia gas having toxicity to be produced to deteriorate the ambient atmosphere and adversely affect an operator.

Storage-generation Tank Device and Storage-generation Tank

FIG. 2 is a vertical sectional view showing a storage-generation tank device 30. As shown in FIG. 2, in the storage-generation tank 31, the water fed through the solvent feeding line L0 is sprinkled uniformly via a plurality of sprinkling nozzles 23a to 23d installed above, thereby to dissolve the urea powder U to generate urea water. In the storage-generation tank device 30, a part of the urea powder U is dissolved in the water from the sprinkling nozzles 23a to 23d, and the other major part of the urea powder U remains undissolved. The storage-generation tank 31 includes, for example, a side wall 31a having a rectangular tube shape (or a cylindrical shape), a bottom wall 31b, and a ceiling wall 31e. The bottom wall 31b includes an inclined wall portion 31c inclined downward at a given gradient and an opening portion 31d formed at a lower end of the inclined wall portion 31c. The ceiling wall 31e is provided with a drug delivery port 31f having an openable cap. Further, the opening portion 31d includes a filter 32 serving as a solid-liquid separation member that separates urea water from the mixture of the urea powder U and the urea water (permits the urea water to pass therethrough for separation). Under the filter 32, there is formed a solution storage portion 33 for storing the urea water. The solution storage portion 33 is integrated with the storage-generation tank 31. Since the urea powder U is highly soluble in water, the urea water having passed the filter 32 and stored in the solution storage portion 33 is almost fully saturated with the dissolved urea powder U. The filter 32, disposed between the storage-generation tank 31 and the solution storage portion 33, may be replaced with any well known separation structure that separates urea water from the mixture of the urea powder U and water.

As shown in FIG. 1, the generation line L1 is provided with a generation density meter CE1 for sensing the density of the urea water, a generation pump P1 that also serves as a densifying pump, a diverging portion to a densifying line L3, a generation valve V1, and a generation flow meter F1 for sensing the amount of urea water delivered to the adjustment tank 41. These components are arranged in the above order from the upstream side. The generation density meter CE1, installed on the generation line L1, may be installed at any other location where it can sense the urea water density of the solution storage portion 33.

The storage-generation tank device 30 is provided with a generation densifying device (a densifying device) 35 for densifying the urea water generated in the storage-generation tank 31. The generation densifying device 35 includes the generation density meter CE1, the generation pump P1, and the generation valve V1 of the generation line L1, the densifying line L3, and a densifying valve V2 interposed in the densifying line L3. Naturally, it may also be possible to provide a three-way valve that serves as both the generation valve V1 and the densifying valve V2, at the diverging portion from the generation line L1 to the densifying line L3.

Operation of Generation Densifying Device

In the above arrangement, the urea water in the solution storage portion 33 is delivered through the generation line L1 to the adjustment tank 41 by actuating the generation pump P1, opening the generation valve V1, and closing the densifying valve V2. At this time, the generation density meter CE1 senses the density of the urea water. When the density of the urea water is lower than an appropriate range, the generation densifying device 35 is actuated by a generation control device (a reducing agent generation control device) 45 shown in FIG. 3 or manually by an operator watching a display device 46. This operation involves closing the generation valve V1, opening the densifying valve V2, and delivering the urea water by the generation pump P1 through the densifying line L3, the solvent feeding line L0, and the heating device 22 to the sprinkling nozzles 23a to 23d, thereby to dissolve the urea powder U again and increase the density of the urea water.

The optimal density of the urea water used in the reducing device 12 ranges from 39 wt % to 41 wt %, as designated by ISO for AUS40. When the density of the urea water is less than 39 wt %, the generation densifying device 35 is actuated.

The storage-generation tank 31 is provided with a solvent level gauge 36 which is a solvent detector for detecting the liquid phase surface of the solution (the urea water) soaked into the urea powder U. The solvent level gauge 36 includes a lead pipe 36a and a contactless distance sensor 36b. The lead pipe 36a connects, for example, between the solution storage portion 33 and the space above the urea powder U in the storage-generation tank 31. The contactless distance sensor 36b senses the level of the liquid phase surface based on the distance from the upper end of the lead pipe 36a to the liquid phase surface. The solvent level gauge 36 may be a magnetic floating, ultrasonic, capacitance, or other types of solvent level gauge 36. As illustrated by the virtual lines, contact level switches 36c, 36d may be provided to detect the presence or absence of the urea water at the upper limit level and the lower limit level of the liquid phase surface.

Figure 3:
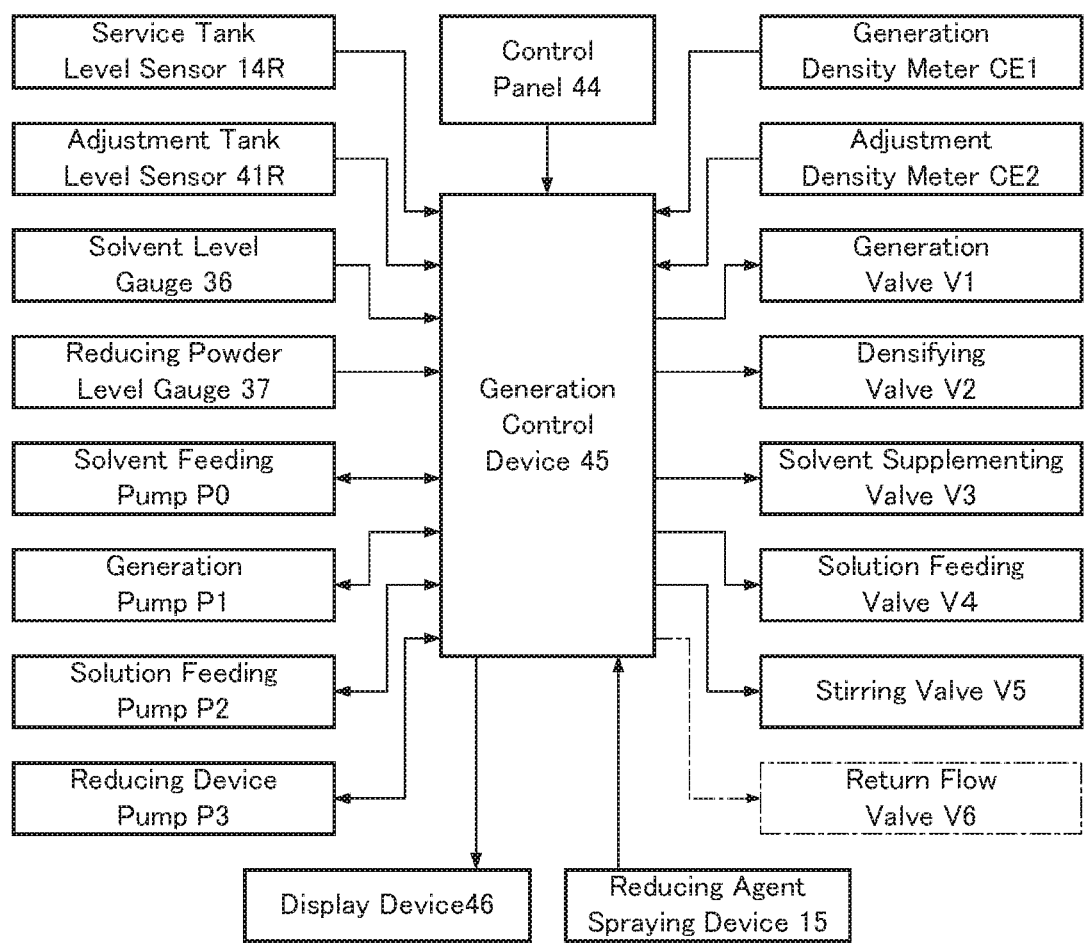
FIG. 3 is a block diagram of an exhaust gas purifying device.

The sensing value of the solvent level gauge 36 is input to the generation control device 45 shown in FIG. 3 to monitor the liquid phase surface of the storage-generation tank 31, and the amount of fed water is controlled such that the liquid phase surface of the solution (the urea water) above the filter 32 is at a level at least a given height d above the filter 32. Thus, the portion of the solution (the urea water) below the liquid phase surface, for example, the portion for the height d=10 cm or more, is soaked into the urea powder U to generate almost saturated urea water having a high density.

A reducing powder level gauge 37 is provided to detect the presence or absence of the urea powder U around the level sensed by the solvent level gauge 36. When the urea water is circulated frequently by the generation densifying device 35, the reducing powder level gauge 37 of an ultrasonic or image-sensing type checks the amount of remaining urea powder U and detects the presence or absence of the urea powder U at the level where the urea powder U can be dissolved to a sufficient density.

Figure 4:
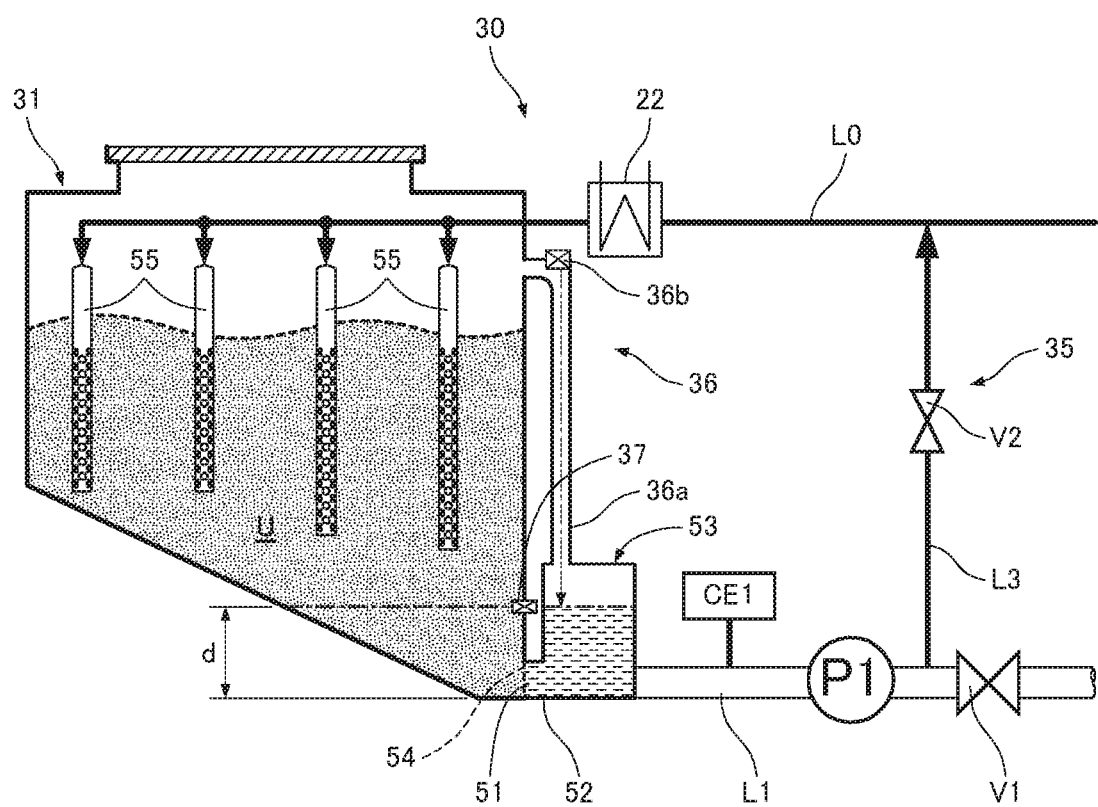
FIG. 4 is a vertical sectional view showing a variation of the storage-generation tank.

In Embodiment 1, the solution storage portion 33 is integrated in the storage-generation tank 31. It may also be possible to provide a solution storage tank (a solution storage portion) 53 separate from the storage-generation tank 31, as shown in FIG. 4. More specifically, the storage-generation tank 31 has an opening portion 51 formed in the side wall 31a near the bottom wall 31b, and the opening portion 51 is connected to the solution storage tank 53 via a pipe 52. The opening portion 51 may be provided with a well known solid-liquid separation member (or a filter) 54 that permits only the urea water to pass therethrough, but the filter 54 is not necessary when the pipe 52 has such a structure that the urea powder U is almost completely dissolved therein, in which, for example, the pipe 52 has a sufficiently small inner diameter or has a labyrinth structure including alternately assembled pipes, so as to prevent the urea powder U from flowing out of the storage-generation tank 31. The solvent level gauge 36 is constituted by a laser, ultrasonic, floating, or other types of detector for measuring the liquid level in the solution storage tank 53.

In place of the sprinkling nozzles 23a to 23d, the storage-generation tank 31 includes a plurality of infiltration pipes 55 connected to the solvent feeding line L0. The plurality of infiltration pipes 55, which are arranged at regular intervals, hang down from above and into the urea powder U. These infiltration pipes 55 have a large number of holes formed in respective lower parts buried in the urea powder U and feed water through the holes into the urea powder U, thereby to dissolve the urea powder U more uniformly.

Adjustment Tank and Adjustment Tank Device

The adjustment tank device 40 includes a dilution device 42. When the density of the urea water fed into the adjustment tank 41 exceeds the appropriate range, the dilution device 42 supplements water into the adjustment tank 41 to dilute the urea water to a density within the appropriate range. Further, the adjustment tank device 40 includes a stirring device 43. When the dilution device 42 supplements water for dilution, the stirring device 43 stirs the urea water to a uniform density.

The solution feeding line L2, which feeds the urea water from the bottom portion of the adjustment tank 41 to the service tank 14, is provided with an adjustment density meter CE2, a solution feeding pump P2 that also serves as a stirring pump (and a return flow pump in Embodiment 2), a diverging portion to a stirring line L5 connecting between the solution feeding line L2 and the adjustment tank 41, and a solution feeding valve V4. These components are arranged in the above order from the upstream side. The adjustment density meter CE2, installed on the solution feeding line L2, may be installed at any other location where it can sense the urea water density of the adjustment tank 41.

The dilution device 42 includes a solvent supplementing line L4, and a solvent supplementing flow meter F2 and a solvent supplementing valve V3 provided on the solvent supplementing line L4. The solvent supplementing line L4 connects between the solvent feeding line L0 and the adjustment tank 41 and also serves as a dilution line. The solvent supplementing line L4 diverges from the solvent feeding line L0 between the solvent supplementing pump P0 and the heating device 22.

The stirring device 43 includes a stirring line L5, a stirring valve V5 interposed in the stirring line L5, a stirring line L5, and a nozzle (not shown) connected to a downstream end (an outlet end) of the stirring line L5 and installed on the adjustment tank 41. The nozzle not shown is disposed, for example, in a tangential direction so as to form an eddy in the urea water contained in the adjustment tank 41, for stirring effectively using the circulated urea water and uniforming the density of the urea water.

The dilution device 42 performs the density adjusting operation as follows. First, the generation pump P1 is actuated, and the generation density meter CE1 senses the density of the urea water delivered through the generation line L1 to the adjustment tank 41. When the urea water density is higher than the appropriate range, the generation control device 45 actuates the dilution device 42 and the stirring device 43. In the dilution device 42, the amount of water to be supplemented is calculated by the generation control device 45 based on the amount of fed urea water sensed by the generation flow meter F1 and the urea water density sensed by the generation density meter CE1, thereby to control the degree and duration of opening of the solvent supplementing valve V3. The amount of water to be supplemented is sensed by the solvent supplementing flow meter F2 and fed back to the generation control device 45. Further, the stirring device 43 operates to close the solution feeding valve V4, open the stirring valve V5, and actuate the solution feeding pump P2, thereby to withdraw the urea water in the bottom portion of the adjustment tank 41 through the solution feeding line L2 and the stirring line L5 and return it to the adjustment tank 41, such that the urea water is stirred by the circulation of the urea water for uniforming the density.

Table 1 shows the opening and closing operations of the valves V1 to V3 for the cases of the urea water densities lower than 39 wt %, from 39 wt % to 41 wt % (the appropriate range), and higher than 41 wt %.

TABLE 1

| | Density Sensed by CE1 | | |
| --- | --- | --- | --- |
| | CE1 < 39% | 39% ≤ CE1 ≤ 41% | 41% < CE1 |
| V1 | Close | Open | Open |
| V2 | Open | Close | Close |
| V3 | Close | Close | Open |

Operation of Gas Purifying Facility

The operation method of the above-described exhaust gas purifying facility will now be described with reference to FIG. 3. The generation control device 45 is provided with a control panel 44 and a display device 46. The control panel 44 allows manual operation and data input. The display device 46 displays information input to the generation control device 45, including the sensing values of the density meters CE1, CE2, level sensors 14R, 41R, and the level gauges 36, 37 and the operation statuses of the pumps P0 to P3 and the valves V1 to V4. As shown in FIG. 3, signals from a marine engine control device that controls the marine combustion engine 16 are input to the reducing agent spraying device 15, and signals from the reducing agent spraying device 15 are input to the generation control device 45.

When the marine combustion engine 16 is driven and an exhaust gas is discharged through the exhaust gas line 16L, the urea water in the service tank 14 is sprayed into the exhaust gas via the reducing agent spraying device 15. When the service tank level sensor 14R (FIG. 3) senses the reduction of the amount of the urea water in the service tank 14, the solution feeding pump P2 is actuated to feed the urea water from the adjustment tank 41 to the service tank 14.

Further, when the adjustment tank level sensor 41R senses the reduction of the amount of the urea water in the adjustment tank 41, the generation pump P1 is actuated to feed the urea water from the solution storage portion 33 to the adjustment tank 41. Still further, when the solvent level gauge 36 (FIG. 3) senses the reduction of the amount of the urea water in the storage-generation tank 31, the solvent feeding pump P0 is actuated to feed water through the solvent feeding line L0 to the storage-generation tank 31.

Advantageous Effects of Embodiment 1

Embodiment 1 produces the following advantageous effects (1) to (6).

(1) The storage-generation tank 31 is provided to store urea powder U and generate urea water by feeding water as a solvent to the stored urea powder U for dissolution. The storage-generation tank 31 stores urea powder U at least in an amount necessary for one voyage. Therefore, it is possible to eliminate equipment that was conventionally necessary such as the storage space for the urea powder U and a conveyor for feeding the urea powder U from the storage tank to the generation tank, thereby to reduce the space required for the exhaust gas purifying facility. In addition, the loading capacity can be reduced as compared to the structure in which the urea powder U or the urea water is loaded.

(2) The storage-generation tank device 30 is provided with the generation densifying device 35 for densifying the urea water generated in the storage-generation tank. Therefore, even when the urea water generated in the storage-generation tank 31 has a low density due to reduction of the amount of the urea powder U or a low temperature of water as a solvent caused by an endothermic action, the generated urea water can be returned to the storage-generation tank 31 through the densifying line L3 to dissolve the urea powder U again, thereby generating the urea water having a high density.

(3) In the adjustment tank device 40, when the urea water delivered to the adjustment tank 41 has a density higher than the appropriate range, the dilution device 42 supplements water as a solvent through the solvent supplementing line L4 to the adjustment tank 41. Thus, the urea water having a density within the appropriate range suited for reduction of the exhaust gas can be fed to the reducing device 12.

(4) Mechanical stirring devices installed on conventional urea water tanks have a complex structure including a propeller and a drive mechanism therefor. In particular, when a ship is equipped with a mechanical stirring device, shaking of the ship due to waves may produce powder impact on a stirring shaft that causes malfunction. In Embodiment 1, the stirring device 43 of the adjustment tank device 40 circulates the urea water of the adjustment tank 41 through the solution feeding line L2 and the stirring line L5. Thus, the urea water in the adjustment tank 41 is stirred by the circulating water flow, resulting in high efficiency of uniforming the density, fewer malfunctions, less need for maintenance, and reduced costs.

(5) The heating device 22 provided on the solvent feeding line L0 makes it possible to heat water to a temperature suited to dissolve the urea powder U, prevent reduction of the dissolution rate and the dissolution density due to an endothermic action occurring when the urea powder U is dissolved, and prevent production of an ammonia gas having toxicity.

(6) In the storage-generation tank 31, the solvent is sufficiently soaked into the urea powder U based on the sensing value of the solvent level gauge 36, making it possible to generate urea water having a high density.

Embodiment 2

FIG. 5 schematically shows an exhaust gas purifying facility of a marine combustion engine according to Embodiment 2 of the present invention. The same members as in Embodiment 1 are denoted by the same reference signs and description thereof will be omitted. In Embodiment 1, the storage-generation tank device 30 is provided with the generation densifying device 35, and the adjustment tank device 40 is provided with the dilution device 42. By contrast, in Embodiment 2, an adjustment tank device 60 is provided with a density adjustment device 61 including the dilution device 42 and an adjustment densifying device (a densifying device) 62.

The solution feeding line L2, which connects between the adjustment tank 41 and the service tank 14, is provided with an adjustment density meter CE2, a solution feeding pump P2 that also serves as a stirring pump and a return flow pump, an upstream connection portion of a return flow line L6 of which an upstream part is partially used also as the stirring line L5, and the solution feeding valve V4. These components are arranged in the above order from the upstream side. The adjustment density meter CE2 measures the density of the urea water flowing through the solution feeding line L2. The return flow line L6 is provided with a diverging portion to the stirring line L5, and a return flow valve V6. These components are arranged in the above order from the upstream side. The downstream end of the return flow line L6 is connected to the solution feeding line L0. Accordingly, when the adjustment density meter CE2 senses that the density of the urea water in the solution feeding line L2 is lower than the appropriate range, the adjustment densifying device 62 operates to close the solution feeding valve V4, open the return flow valve V6, (and close the stirring valve V5) thereby to return the urea water in the solution feeding line L2 through the return flow line L6 and the solvent feeding line L0 to the storage-generation tank 31. The returned urea water is sprinkled again from the sprinkling nozzles 23a to 23d to dissolve the urea powder U again, and the urea water is delivered from the solution storage portion 33 to the adjustment tank 41, thus densifying the urea water. Naturally, it may also be possible to provide a three-way valve that serves as both the return flow valve V6 and the stirring valve V5, at the diverging portion from the return flow line L6 to the stirring line L5.

The density adjustment device 61 performs the density adjusting operation as follows. In the density adjustment device 61, the solution feeding pump P2 is actuated, and the adjustment density meter CE2 senses the density of the urea water delivered through the solution feeding line L2 to the service tank 14. When the urea water density is higher than the appropriate range, the generation control device 45 actuates the dilution device 42 and the stirring device 43. First, the stirring device 43 operates to close the solution feeding valve V4 and the return flow valve V6 and open the stirring valve V5, thereby to return the urea water in the solution feeding line L2 through the return flow line L6 and the stirring line L5 to the adjustment tank 41. Then, in the dilution device 42, the generation control device 45 controls the degree of opening of the solvent supplementing valve V3 based on the density of the urea water sensed by the adjustment density meter CE2 and the amount of the urea water in the adjustment tank 41, thereby to supplement a given amount of water through the solvent supplementing line L4 to the adjustment tank 41, thus diluting the urea water to a density within the appropriate range. The operation of the stirring device 43 uniforms the density of the urea water in the adjustment tank 41, which enables the adjustment density meter CE2 to sense the density of the urea water accurately.

Conversely, when the urea water density sensed by the adjustment density meter CE2 is lower than the appropriate range, the adjustment densifying device 62 increases the density of the urea water as described above.

Table 2 shows the opening and closing operations of the valves V1 and V3 to V6 for the cases of the urea water densities lower than 39 wt %, from 39 wt % to 41 wt % (the appropriate range), and higher than 41 wt %.

TABLE 2

| | Density Sensed by CE2 | | |
|---|---|---|---|
| | CE2 < 39% | 39% ≤ CE2 ≤ 41% | 41% < CE2 |
| V1 | Open | Open | Open(Close) |
| V3 | Close | Close | Open |
| V4 | Close | Open | Close |
| V5 | Open(Close) | Close | Open |
| V6 | Open | Close | Close |

Embodiment 2 produces the same advantageous effects as described in (1), (3), (5), and (6) for Embodiment 1. In addition, since the adjustment tank 41 is provided with the density adjustment device 61 including the dilution device 42 and the adjustment densifying device 62, it is possible that the dilution device 42 reduces the density and the urea water or the adjustment densifying device 62 facilitates densification of the urea water based on the sensing value of the adjustment density meter CE2, thereby to obtain urea water having a density within the range suited for reduction.

Embodiment 3

Figure 6:
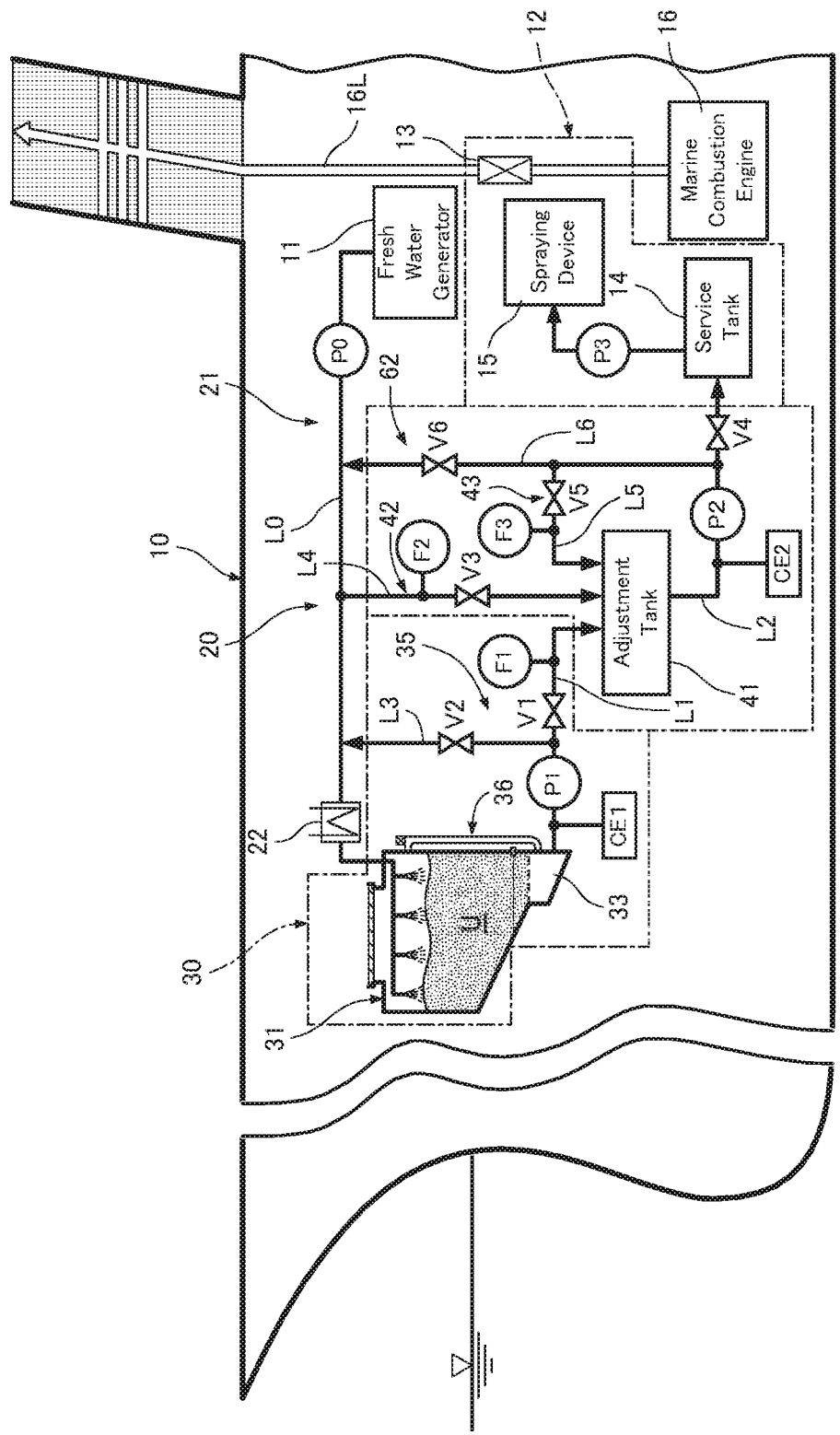
FIG. 6 is a schematic view showing Embodiment 3 of the exhaust gas purifying facility of a marine combustion engine according to the present invention.

FIG. 6 schematically shows an exhaust gas purifying facility of a marine combustion engine according to Embodiment 3 of the present invention. Embodiment 3 is an exhaust gas purifying facility including the generation densifying device 35 of the storage-generation tank device 30 described for Embodiment 1, the adjustment densifying device 62 of the adjustment tank device 60 described for Embodiment 2, and the dilution device 42 and the stirring device 43 common to Embodiments 1 and 2.

In Embodiment 3, it is possible to selectively use the two densifying devices 35, 62 to increase the density of the urea water or use the dilution device 42 and the stirring device 43 to reduce the density of the urea water. Further, when a malfunction occurs to disable one of the densifying devices 35, 62, the densification is possible using the other. Embodiment 3 produces the same advantageous effects as Embodiments 1 and 2.

Embodiments 1 to 3 are based on the selective catalytic reduction (SCR) method that uses a catalyst, but the present invention may also be applied to the selective non-catalytic reduction (SNCR) method that does not use a catalyst.

The components of Embodiments 1 to 3 may be combined together as necessary as long as they do not interfere or conflict with each other.

INDUSTRIAL APPLICABILITY

The present invention may be used as an exhaust gas purifying device of a combustion engine on land (for example, a thermal power plant, a garbage incinerator, or the like), in addition to that of the marine combustion engine 16. The combustion engines herein referred to are not limited to mechanical devices (engines) that convert thermal, electrical, hydraulic, or other forms of energy into mechanical energy. The combustion engines herein referred to include facilities that undergo combustion such as a thermal power plant or a garbage incinerator.

What is claimed is:

1. An exhaust gas purifying facility of a combustion engine, comprising:
   a combustion engine;
   a reducing agent spraying device for feeding a reducing agent solution into an exhaust gas in an exhaust gas line of the combustion engine;
   a reducing catalyst for removing air pollutants from the exhaust gas fed with the reducing agent solution; and
   a generation device for generating the reducing agent solution from reducing agent powder,
   wherein the generation device includes:
      a storage-generation tank device having a storage-generation tank for storing the reducing agent powder and feeding a solvent to the reducing agent powder for dissolution, the storage-generation tank formed of a single tank,
      wherein the storage-generation tank device includes a densifying device for densifying the reducing agent solution generated in the storage-generation tank,
      wherein the densifying device includes:
         a generation density meter for measuring a density of the reducing agent solution; and
         a densifying line for returning the reducing agent solution generated in the storage-generation tank back to the storage-generation tank to dissolve the reducing agent powder again.

2. The exhaust gas purifying facility of a combustion engine according to claim 1, wherein
   an adjustment tank device includes a dilution device for adjusting the density of the reducing agent solution, and
   the dilution device includes a solvent supplementing line for supplementing the solvent to the adjustment tank.

3. The exhaust gas purifying facility of a combustion engine according to claim 1, further comprises:
   an adjustment tank device includes a solution stirring device for stirring the reducing agent solution, and
   the solution stirring device includes a stirring line for withdrawing the reducing agent solution from the adjustment tank and returning the reducing agent solution to the adjustment tank, so as to circulate the reducing agent solution and stir the reducing agent solution in the adjustment tank.

4. The exhaust gas purifying facility of a combustion engine according to claim 1, wherein
the combustion engine is a marine combustion engine,
the exhaust gas purifying facility includes:
- a solvent generator for generating the solvent by extracting fresh water from sea water; and
- a solvent feeding line for feeding the solvent to the storage-generation tank, and the solvent feeding line is provided with a heating device for heating the solvent to an appropriate temperature.

5. The exhaust gas purifying facility of a combustion engine according to claim 1, wherein
the storage-generation tank device includes:
- a solution storage portion for storing the reducing agent solution separated from the reducing agent powder by a solid-liquid separation member; and
- a solvent detector for detecting a liquid phase surface of the reducing agent solution in the adjustment tank.

6. An exhaust gas purifying facility of a combustion engine, comprising:
- a combustion engine;
- a reducing agent spraying device for feeding a reducing agent solution into an exhaust gas in an exhaust gas line of the combustion engine;
- a reducing catalyst for removing air pollutants from the exhaust gas fed with the reducing agent solution; and
- a generation device for generating the reducing agent solution from reducing agent powder, wherein the generation device includes:
a storage-generation tank device having a storage-generation tank for storing the reducing agent powder and feeding a solvent to the reducing agent powder for dissolution; and
an adjustment tank device having an adjustment tank for storing the reducing agent solution withdrawn from the storage-generation tank, the adjustment tank device being capable of adjusting a density of the reducing agent solution, the adjustment tank device including a density adjustment device for adjusting the density of the reducing agent solution into an appropriate range, and wherein the density adjustment device includes:
an adjustment density meter for measuring the density of the reducing agent solution of the adjustment tank;
a return flow line for returning the reducing agent solution of the adjustment tank to the storage-generation tank to dissolve the reducing agent powder again; and
a dilution line for supplementing the solvent to the adjustment tank.

* * * * *